US005912784A

United States Patent [19]
Bronshvatch et al.

[11] Patent Number: 5,912,784
[45] Date of Patent: Jun. 15, 1999

[54] DUAL MEMBER DISC CLAMP FOR UNIFORM CLAMPING LOAD DISTRIBUTION

[75] Inventors: Efim Bronshvatch, Saratoga; Ming-Goei Sheu, Cupertino, both of Calif.

[73] Assignee: Seagate Technology, Inc., Scotts Valley, Calif.

[21] Appl. No.: 08/972,881

[22] Filed: Nov. 18, 1997

Related U.S. Application Data

[60] Provisional application No. 60/031,163, Nov. 19, 1996, abandoned.

[51] Int. Cl.$^6$ .................................................. G11B 17/08
[52] U.S. Cl. ............................................................ 360/98.08
[58] Field of Search ............................ 360/98.08, 99.12

[56] References Cited

U.S. PATENT DOCUMENTS

| | | | |
|---|---|---|---|
| 5,333,080 | 7/1994 | Ridinger | 360/99.12 |
| 5,490,024 | 2/1996 | Briggs et al. | 360/99.12 |
| 5,517,376 | 5/1996 | Green | 360/98.08 |
| 5,528,434 | 6/1996 | Bronshvatch et al. | 360/98.08 |
| 5,694,269 | 12/1997 | Lee | 360/98.08 |

*Primary Examiner*—A. J. Heinz
*Attorney, Agent, or Firm*—Fliesler, Dubb, Meyer & Lovejoy LLP

[57] ABSTRACT

A disc drive including a dual disc clamp for clamping a number of hard discs within a disc drive is disclosed. The clamp is comprised of a top circular clamp member in contact with a bottom circular clamp member, with the clamp members having the same physical shape and area. The bottom clamp member has number of holes formed therein which reduce the disc distortion. The top clamp member has a concave upper surface, while the bottom clamp member has a convex upper surface. The clamp holds the discs in place through pressure provided by a plurality of screws which are passed through holes in the clamp members. The disc drive also includes a spindle motor to which the dual disc clamp is connected. The spindle motor provides a greater torque constant, thereby allowing lower start and run current.

21 Claims, 7 Drawing Sheets

5,912,784

DUAL MEMBER DISC CLAMP FOR UNIFORM CLAMPING LOAD DISTRIBUTION

CLAIM OF PRIORITY

This application claims the benefit of U.S. Provisional Application No. 60/031,163, filed Nov. 19, 1996.

FIELD OF THE INVENTION

The present invention generally relates to data storage devices and, more particularly, to a disc clamp for securing one or more hard discs within a disc drive having a powerful spindle motor.

BACKGROUND OF THE INVENTION

Work stations, personal computers and portable computers require disc drives that provide a large amount of data storage within a minimum physical area. Generally, disc drives operate by positioning a transducer (or read/write head) over respective tracks on a rotating magnetic storage disc. Positioning of the transducer over the tracks is accomplished by an actuator coupled to control electronics, to control the positioning of the actuator and the read/write functions of the transducer.

Greater demands are being placed on disc drives by the use of multi-user and/or multi-tasking operating systems, work stations which provide an operating environment requiring the transfer of large amounts of data to/from a hard disc and/or large numbers of disc accesses to support large application programs or multiple users, the present popularity of notebook and laptop computers and the continuing trend toward higher performance microprocessors. Also, systems require hard disc drives having high capacity storage capability, while occupying a minimal amount of space within the host system. In order to accommodate these demands, there is a need for smaller hard disc drives which, at the same time, have increased storage capacity.

One measure of determining the storage capacity of a disc drive is the flying height of the transducer above the rotating disc. In conventional hard disc drives, once the hard disc achieves a certain angular velocity after startup of the drive, a cushion of air above the surface of the hard disc forces the transducer up off the surface of the disc by a very small amount to thereby achieve a flying height. Flying the transducer closer to the disc surface allows for higher data bit a density (i.e., the number of data bits per square inch on the disc surface). Consequently, there has been an industry-wide push to decrease the height at which transducers are maintained over the disc surface without actually contacting the disc surface.

When a transducer flies over a rotating disc, the flying height tends to fluctuate slightly above and below the normal flying height because the disc surface is not flat. At lower flying heights, a variation in the fly height may cause the transducer to randomly contact the disc surface. This situation is referred to as intermittent contact. Repeated intermittent contact between the transducer and the disc surface can damage the transducer and/or the disc, and may cause drive failures in an extremely short period of time.

Special attention must be paid to the mechanism used to clamp the disc or discs within the drive. Disc distortion caused by conventional clamping mechanisms has become a significant problem, particularly near the inner diameter of the disc.

In conventional disc drives, the disc is provided on a cylindrical hub of a spindle motor. A clamp is provided on top of the hub, having a larger radius than that of the hub such that an outer circumferential portion of the clamp is in contact with the disc. A plurality of screws fit through holes around the circumference of the clamp, and into threaded bores in the hub. When the screws are tightened, the force applied by the screws is transferred to the outer circumferential portion of the clamp, which contacts the disc in order to secure the disc or discs to the spindle motor hub. The discs must be secured under a considerable force in order to prevent any slippage of one or more discs in the presence of mechanical shocks. Even very slight slippage of a disc within a drive could result in mechanical off tracking of the transducer which could result in data transfer errors or servo failure.

Since an individual screw can only deliver a certain amount of clamping force, the total member of screws required to secure the discs to the spindle motor can he determined for a given application once the size of the screws is defined.

Ideally, the force exerted by the disc clamp at the circular line of contact defined between the clamp and disc should be uniform around the entire line of contact. However, the force is stronger at points around the line of contact located radially outward from the screws and weaker in between the screws. The fluctuation of the clamping force around the line of contact will cause circumferential waviness (or distortion) of the disc, especially near the inner diameter thereof.

One way to reduce disc waviness, when the disc is clamped to a spindle motor, is to use a greater number of screws than required by the particular clamping force. The greater the number of screws, the more uniform the clamping force. However, increasing the number of screws used has a negative affect on disc drive manufacturability because of the need to repeatedly tighten the screws in a particular sequence in order to provide a uniform clamping force over the inner diameter of the disc.

Another way to reduce disc waviness is to provide a stiffening ring between the screws, used to hold the disc(s) in contact with the spindle motor, and the line of contact as disclosed in U.S. Pat. No. 5,528,434, assigned to the assignee of the present invention. The stress concentration around each screw dissipates after application of the stiffening ring. Thus, the clamping force can be distributed evenly around the line of contact. A drawback of using a stiffening ring to reduce disc waviness is that the screws need to be located toward the inner diameter of the disc clamp in order to provide adequate space for the stiffening ring. As a result, the top portion of the spindle motor hub must be made thicker in order to provide enough threaded area to accept the screws. Consequently, less space is available for laminations inside the spindle, thereby reducing spindle motor power.

SUMMARY OF THE INVENTION

The aforementioned and related drawbacks of clamping a single hard disc, or a plurality of hard discs, to the hub of a spindle motor are overcome by the present invention. The present invention is directed to a dual clamp arrangement which affixes any number of hard discs to the hub of a spindle motor while, at the same time, greatly reducing clamp distortion and disc waviness.

The dual disc clamp is affixed to a spindle motor. The dual disc clamp includes a pair of juxtaposed clamp members, with each clamp member being substantially circular, with parallel upper and lower surfaces which are rounded to define an arcuate shape of the individual clamp members in cross section. Each clamp member includes a plurality of holes spaced evenly around an outer circumference thereof. When fixedly connecting the disc clamp to a spindle motor, the first and second clamp members are brought together by a plurality of screws and the top disc.

The two circular members of the disc clamp according to the present invention reduce disc waviness resulting from local stresses caused by the clamping screws themselves. They accomplish this by transmitting the clamping forces from the screws over a relatively long pathway, i.e., from the outer diameter of the first circular member to the inner diameter of the first circular member, from the inner diameter of the first circular member to the inner diameter of the second circular member, from the inner diameter of the second circular member to the outer diameter of the second circular member, and from the outer diameter of the second circular member to the discs. This long pathway allows the local stresses caused by the screws to dissipate. In conventional designs, the local stresses from the clamping screws are generally transmitted directly to the discs.

The screws do not contact the second circular clamp member, but instead pass through the second clamp member and are secured into the hub of the spindle motor. The screw holes in the second circular member cause variations in the way the forces exerted on the inner diameter of the second circular member are transmitted to the outer diameter of the second circular member. Thus, the force at the outer diameter of the second circular member along a radius not including a screw hole will be different than the force at the outer diameter along a radius including a screw hole.

In order to reduce the magnitude of distortion created at any single screw hole in the second circular member, preferred embodiments of the present invention further include a plurality of holes in the second circular member in addition to the screw-receiving holes. The large number of holes in the second circular member reduces the distortion resulting from any single hole. This feature, together with dissipating the local stresses over the long pathway of the two circular members prevents distortion of the discs.

A further feature of the present invention relates to the fact that the screws enter the spindle motor hub at the outer circumference of the disc clamp. This provides more room for the stator laminations, and consequently, a more powerful spindle motor may be placed within the disc drive.

Another advantage of the present invention is that it enhances manufacturability because of the reduced number of screws needed to achieve the same level of disc flatness.

BRIEF DESCRIPTION OF THE DRAWINGS

These and other advantages of the present invention will become apparent from the following description of the embodiments, taken in conjunction with the accompanying drawings, where like numerals represent like elements in which.

DESCRIPTION OF THE EMBODIMENTS

The present invention will now be described with reference to FIGS. 1 and 4–9, which illustrate a disc drive having a novel disc clamping design.

Figure 1:
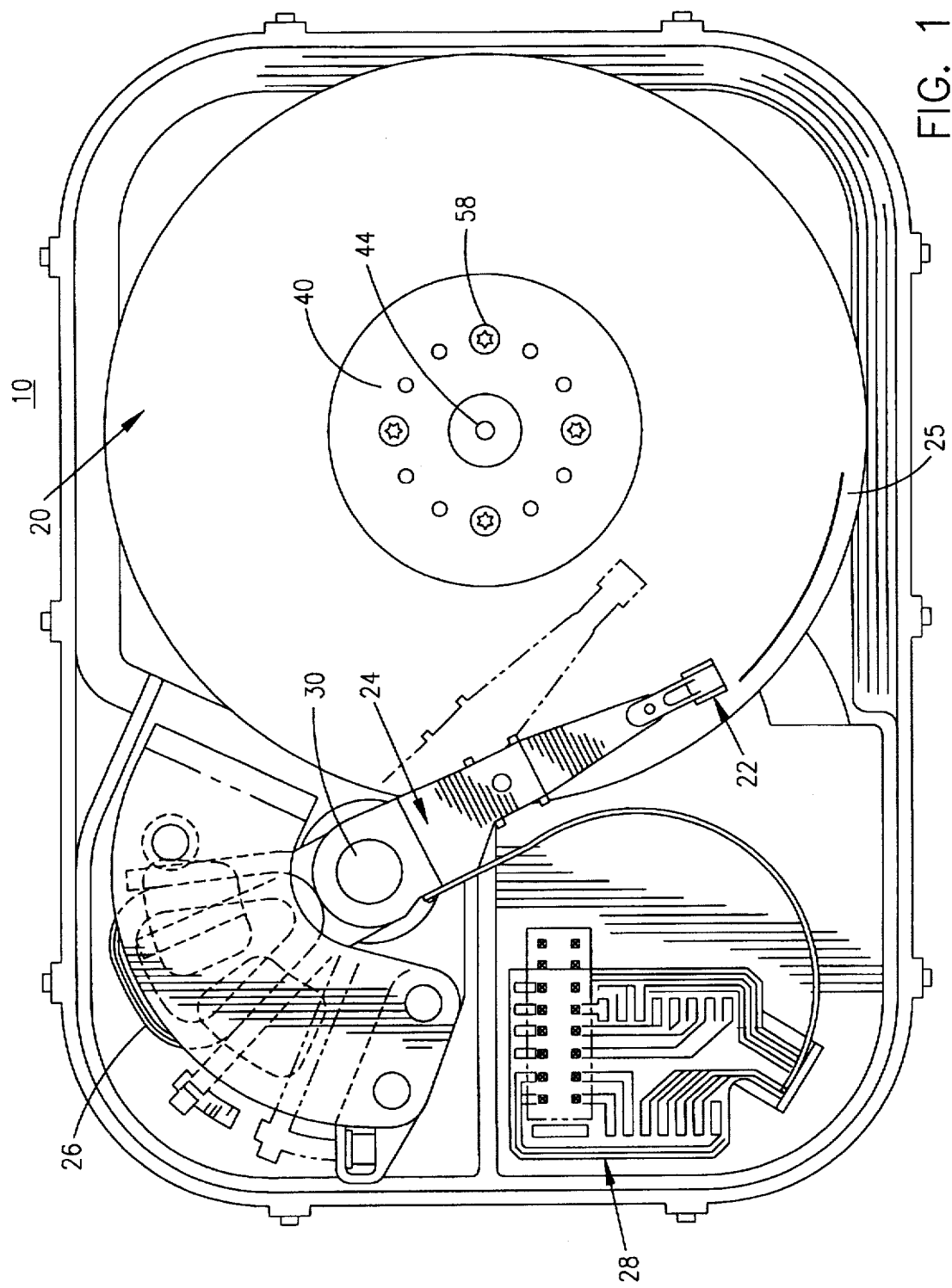
FIG. 1 presents a cutaway top view of a disc drive incorporating the dual disc clamp of the present invention.

FIG. 1 presents a cutaway top view of a disc drive 10 having one or more hard discs 20, with each of the hard discs having information written on a series of data tracks 25 formed thereon. Also included within the disc drive is a transducer 22 for reading the information contained on the hard discs and writing information to the hard discs 20. The transducer 22 may be a conventional inductive element, or in an alternate embodiment, may be a magneto-resistive (MR) element. The transducer 22 is connected to an actuator arm 24 whose movements are controlled by a voice coil motor 26 pivotable about a pivot 30. Control circuitry 28 used to control the operation of the actuator arm and other components (not shown) is also present within the disc drive 10. The hard discs 20 are connected to a spindle motor 44 through use of the dual disc clamp 40 of the present invention. The dual disc clamp affixes the hard discs 20 to the hub of the spindle motor 44 by application of four screws 58. During operation of the disc drive 10, the hard discs 20 are rotated by the spindle motor and the actuator arm 24 moves the transducer 22 across the surface of the hard discs 20 so that data is transferred between the transducer 22 and the hard discs 20.

Figure 2:
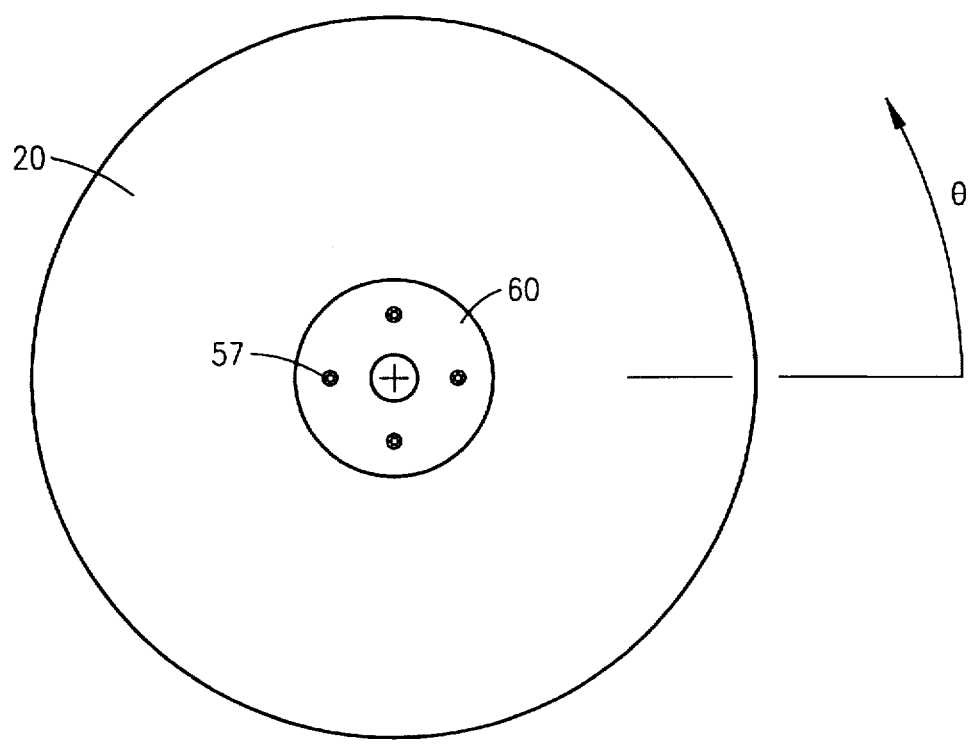
FIG. 2 presents a schematic, top view of a conventional disc clamp fastened onto a disc by four screws.

FIG. 2 presents a top view of a conventional disc clamp 60 fastened onto a disc 20. The disc clamp has a plurality of holes formed therein. A fastener, such as for example mounting screw 57, is inserted into each of the holes and into the hub of the spindle motor to hold the disc(s) in place on the spindle motor. It is understood that other fasteners, such as for example pins or rivets, may be used instead of screw 57. Although the screws provide the force to keep the discs in place, a large number of distortions are transferred to the disc surface because the stress of the mounting screws is greatest at the area immediately surrounding the mounting screws and not as great in the area between the mounting screws. This difference in pressure causes distortions on the disc surface which may alter the flying height of the transducer. In disc drives, the transducer preferably flies at a substantially uniform, and very small distance above the disc surface (referred to as flying height) to maximize the density of information transferred to/from the disc. Distortions present on the disc surface reduces the flying height of the transducer to the point where intermittent contact between the transducer and disc occurs. Such intermittent contact may result in damage and/or drive failure.

Figure 3:
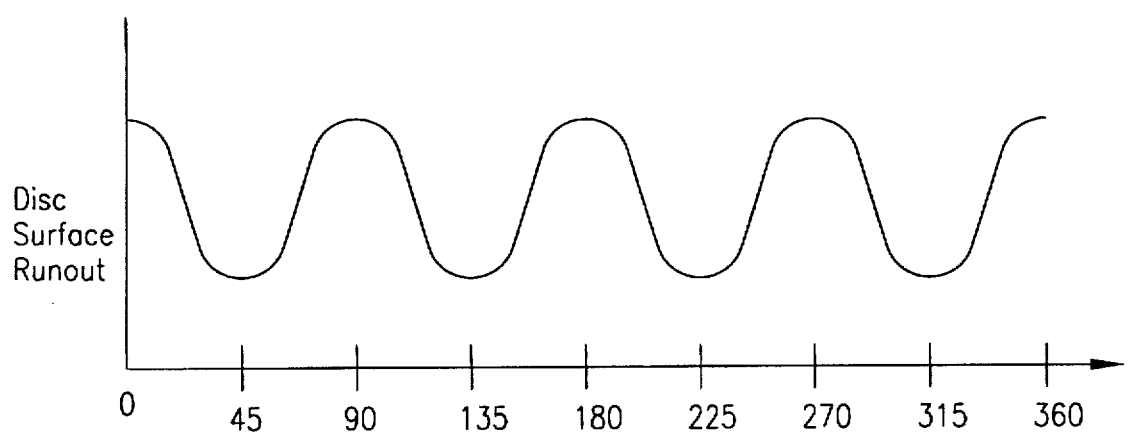
FIG. 3 presents a graph illustrating disc waviness or distortion caused by the conventional disc clamp of FIG. 2.

FIG. 3 presents a graph illustrating the distortion present on the disc surface caused by the conventional disc clamp shown in FIG. 2. In the graph, the horizontal axis represents one full circumference of the disc beginning at a location radially opposite one of the clamping screws, while the vertical axis represents the disc surface runout caused by the mounting screws. In the conventional disc clamp shown in FIG. 2, four holes are present for providing openings for mounting screws. Thus, the locations of the mounting holes occur every 90 degrees. As can be seen from the graph of FIG. 3, the deflection of the disc is greatest where the mounting screws are present, while the deflection is less at areas in between the mounting screws. It is this waviness (or non-flatness) of the hard disc, caused by the non-uniform distribution of the clamping force provided by conventional disc clamps, which results in the lack of uniform flying height of the transducer and intermittent contact of the transducer with the disc.

Figure 4:
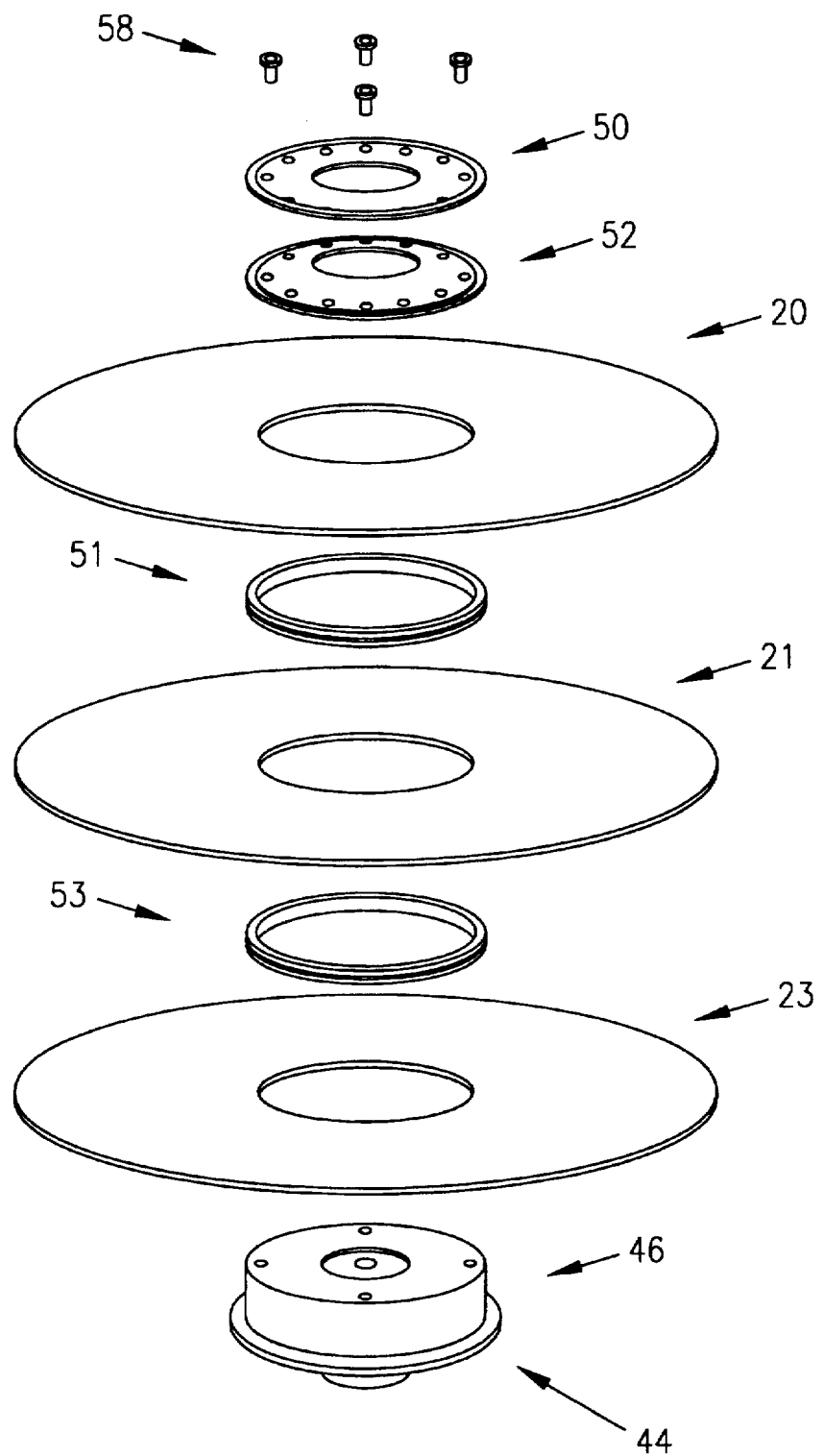
FIG. 4 presents an exploded isometric view of the elements of a disc clamping system using the dual disc clamp of the present invention.

FIG. 4 presents an exploded isometric view of the components of the dual disc clamp of the present invention. As shown, a spindle motor 44 has a hub 46 having a plurality of hard discs 20, 21 and 23 stacked thereon. In a preferred embodiment, three hard discs are used within the disc drive. However, varying numbers of hard discs can be clamped using the dual disc clamp of the present invention. The bottom hard disc 23 is applied about the hub 46. An annular spacer 53, made of stainless steel, is applied on top of the bottom hard disc 23 to separate the bottom disc 23 from a middle hard disc 21 placed on top of the annular spacer 53. Another annular spacer 51, also made of stainless steel, is placed between the middle hard disc 21 and a top hard disc 20.

The dual disc clamp of the present invention includes a first circular member 50 having a concave-shape upper surface (as viewed in FIG. 4) and includes a series of holes formed through the outer circumference of the member for passing a series of screws 58 to the hub 46 of the spindle motor 44. The screws 58, or other threaded elements, are used to couple the first and second circular members 50 and 52, respectively, to the hub of the fixed-shaft spindle motor 44. The first circular member 50 is juxtaposed with a second circular member 52 having a total of twelve holes formed on the outer circumference thereof. The second circular member 52 has a convex upper surface (as viewed in FIG. 4) with four of the holes used to pass the series of screws 58 to the hub of the spindle motor 44. The outer circumference of the second circular member 52 lies in contact with the top surface of the top hard disc 20. In a preferred embodiment, the first and second circular members 50 and 52 are made of stainless steel.

Figure 5A:
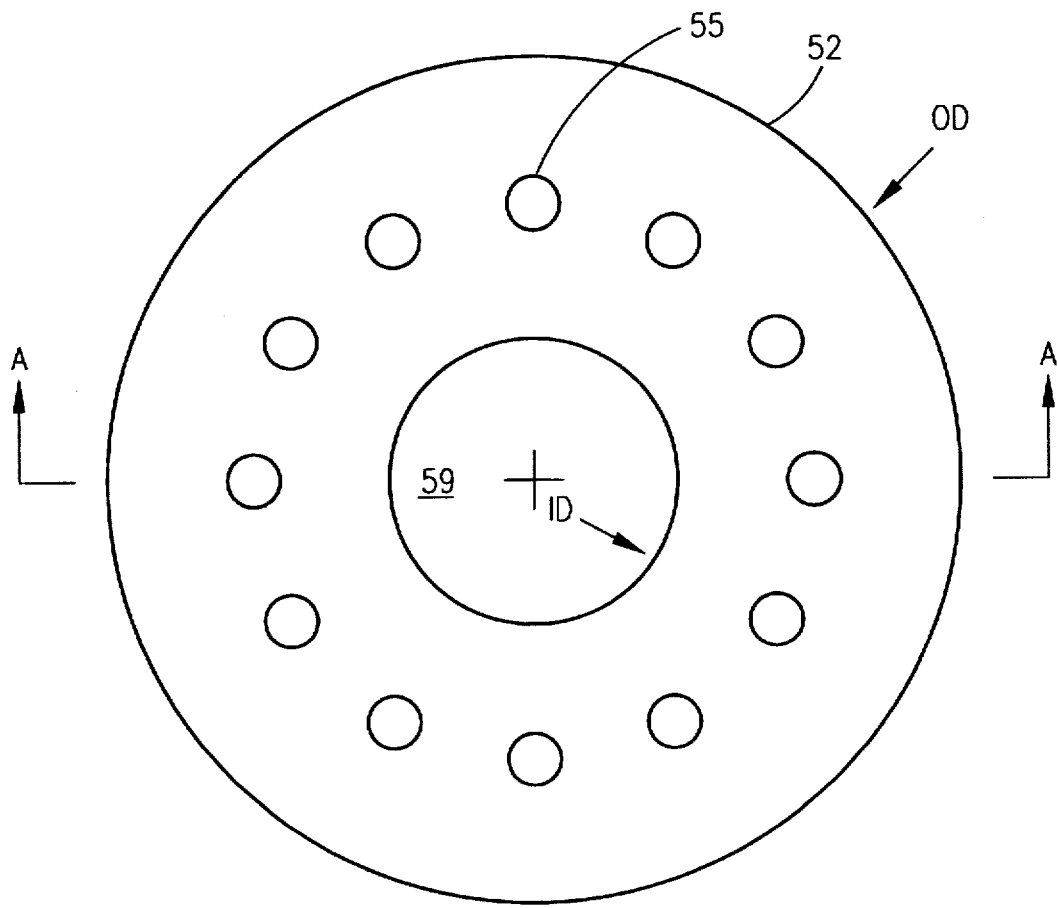
FIGS. 5a–5b present schematic top and side views of a portion of the disc clamp of the present invention.

FIG. 5a presents a schematic top view of the second circular member 52. As shown, the second member 52 is circular in shape and has a diameter of about 0.9 inch. The second circular member 52 also includes twelve holes 55 formed on the outer circumference thereof. Each of these holes 55 has a diameter of about 0.065 inch and are placed about 0.150 inch from the inner diameter (ID) of the circular member. The second circular member 52 also has a central opening 59 having a diameter of about 0.4 inch.

Figure 5B:
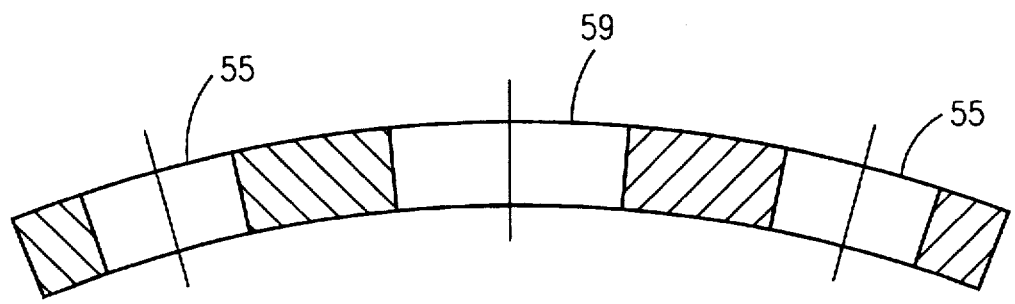

FIG. 5b presents a cross-sectional side view of the second circular member 52 taken across the line A—A. In a preferred embodiment, the second circular member 52 has a thickness in the range of 0.014 inch–0.016 inch, and preferably 0.015 inch. The first circular member 50 has the same physical characteristics as those discussed above with respect to the second circular member 52 with the exception that the first circular member has only four holes formed thereon. However, in an alternate embodiment, the first circular member has twelve holes formed thereon to allow the first and second members to be identical and interchangeable.

Figure 6:
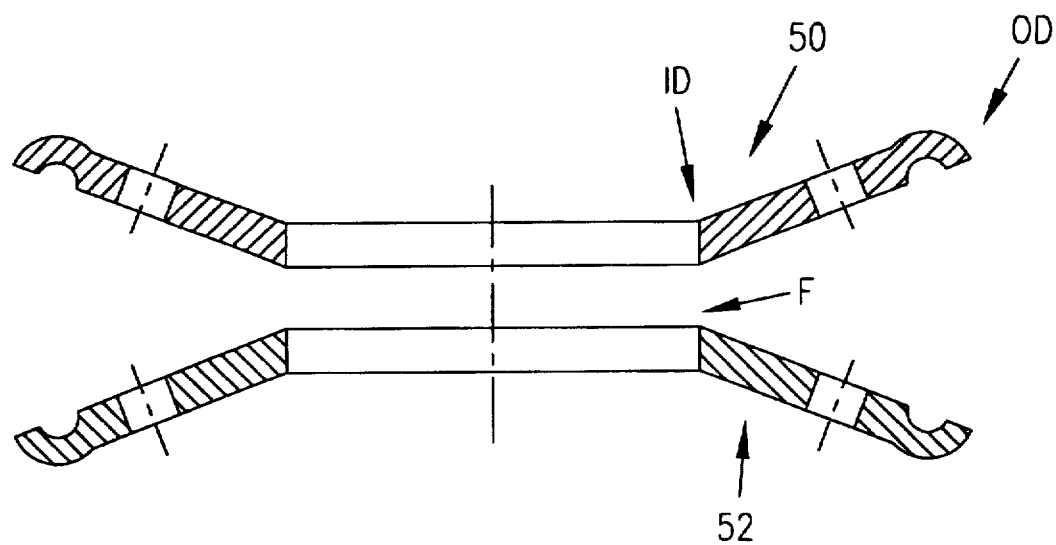
FIG. 6 presents a sectional side view of the circular members of the dual disc clamp of the present invention before being coupled with threaded elements.

FIG. 6 presents a sectional side view of the first circular member 50 and the second circular member 52 of the dual disc clamp before a clamping force is applied thereto. As shown in FIG. 6, the first circular member 50 has an upper surface having a concave shape, while the second circular member 52 has an upper surface having a convex shape. In operation, when a screw, or other threaded member, is used to couple the circular members 50 and 52 together, a force generated by the screw is first transmitted across the first circular member 50 to the inner diameter of the first circular member 50 then onto the second circular member 52 as shown by the line F in FIG. 6. Therefore, upon coupling the first and second circular members together, the screws 58 load the first circular member 50, and the first circular member 50 in turn loads the second circular member 52.

Figure 7:
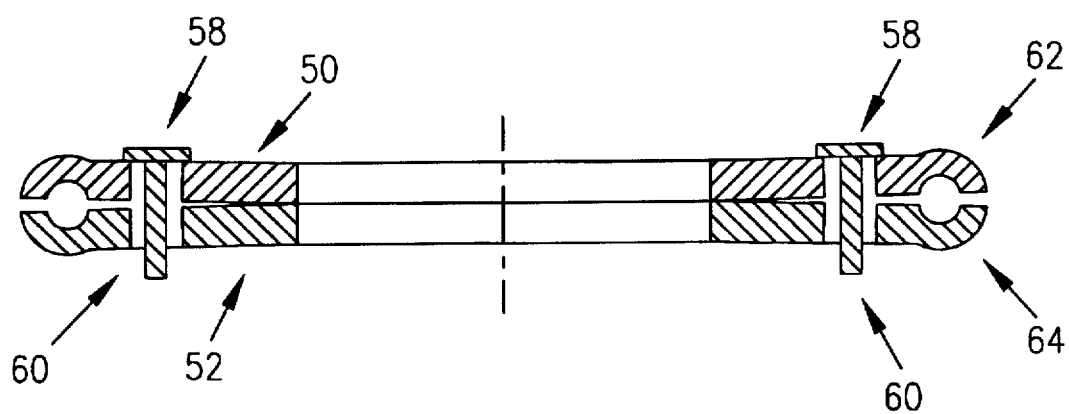
FIG. 7 presents a sectional side view of the circular members of the dual disc clamp of the present invention after being coupled with threaded members.

FIG. 7 presents a sectional side view of the dual disc clamp of the present invention with the first circular member 50 and the second circular member 52 coupled together through the use of clamping screws 58, or other threaded elements. In a preferred embodiment, there are four such screws 58. The screws 58 in a completed disc clamp have a first end abutting against an upper surface of the first circular member 50, and a second end 60 affixed within threads in the spindle motor hub 46. The screws 58 pass through holes provided within the second circular member 52 without contacting the second circular member.

The first circular member 50 has four holes through which the screws 58 pass. The forces generated by each of the screws on the first circular member translate from the screw holes at the outer circumferential edge to the inner diameter of the first circular member, where the forces are evenly distributed. From the inner diameter of the first circular member, the forces are transmitted to the inner diameter of second circular member 52. The applied forces at the inner diameter of the second circular member are in turn translated to the outer diameter of the second circular member. As the outer diameter of the second circular member lies in contact with the upper disc, the forces at the outer diameter of the second circular member serve to secure the discs in proper position on the spindle motor hub.

The second circular member must include a hole for each screw to pass therethrough and into the spindle motor hub. As previously discussed, the screw holes in the second circular member cause variations in the way the forces exerted on the second circular member are transmitted to the outer diameter of the second circular member. That is, the force at the outer diameter of the second circular member along a radius not including a screw hole will be different than the force at the outer diameter along a radius including a screw hole. In conventional disc clamps, this variation in forces around the outer diameter of the clamp results in distortion in the clamp, and consequently the discs with which the disc clamp is in contact.

It is therefore a feature of the present invention to provide a plurality of holes around the outer circumference of the second circular member 52, in addition to the screw-receiving holes, to reduce the distortion resulting from the screw hole asymmetries. By providing a large number of holes around the circumference, the asymmetry and distortion produced in the second circular member by any single hole is greatly reduced. The deflection is in effect evenly distributed around the circumference of the circular member by the large number of holes.

In a preferred embodiment, the second circular member 52 may include twelve holes, each of substantially the same diameter and at the same radius from the center of the circular member. It is understood that the number of holes may be lesser or greater than twelve in alternative embodiments. Additionally, it is understood that the radial location of a first hole in the second circular member may be different than the radial location of a second hole in the second circular member, with the provision that the holes receiving the screws 58 therethrough are aligned with the corresponding holes in the first circular member and hub.

Those of skill in the art will recognize that the clamp according to the present invention serves to reduce disc distortion in at least two separate and independent ways. The first is to reduce the distortion resulting from local stresses caused by the clamping screws themselves. The second is to reduce the distortion resulting from the asymmetries caused by the screw holes. It is noted that these causes of local stress are distinct from each other.

The first way distortion is reduced is by transmitting the clamping forces from the screws over a relatively long pathway, i.e., from the outer diameter of the first circular member to the inner diameter of the first circular member, from the inner diameter of the first circular member to the inner diameter of the second circular member, from the inner diameter of second circular member to the outer diameter of the second circular member, and from the outer diameter of the second circular member to the discs. This long pathway allows the local stresses caused by the screws to dissipate. In conventional designs, the local stresses from the clamping screws are generally transmitted directly to the discs. The second way distortion is reduced is by providing a large number of holes in the second circular member, thus reducing the distortion resulting from any single hole.

In a preferred embodiment, once the first and second circular members (50, 52) are coupled together, the outer circumferential edge 62 of the first circular member 50 does not contact the outer circumferential edge 64 of the second circular member 52. This ensures that the force applied by the screws is transferred first to the ID of the first circular member and then to the second circular member as described above. If the outer circumferential edges of the first and second circular members come into contact, some of the localized stresses resulting from the clamping screws contacting the first circular member 50 could be passed on to the outer diameter of the second circular member 52, and from there, possibly to the discs.

Figure 8A:
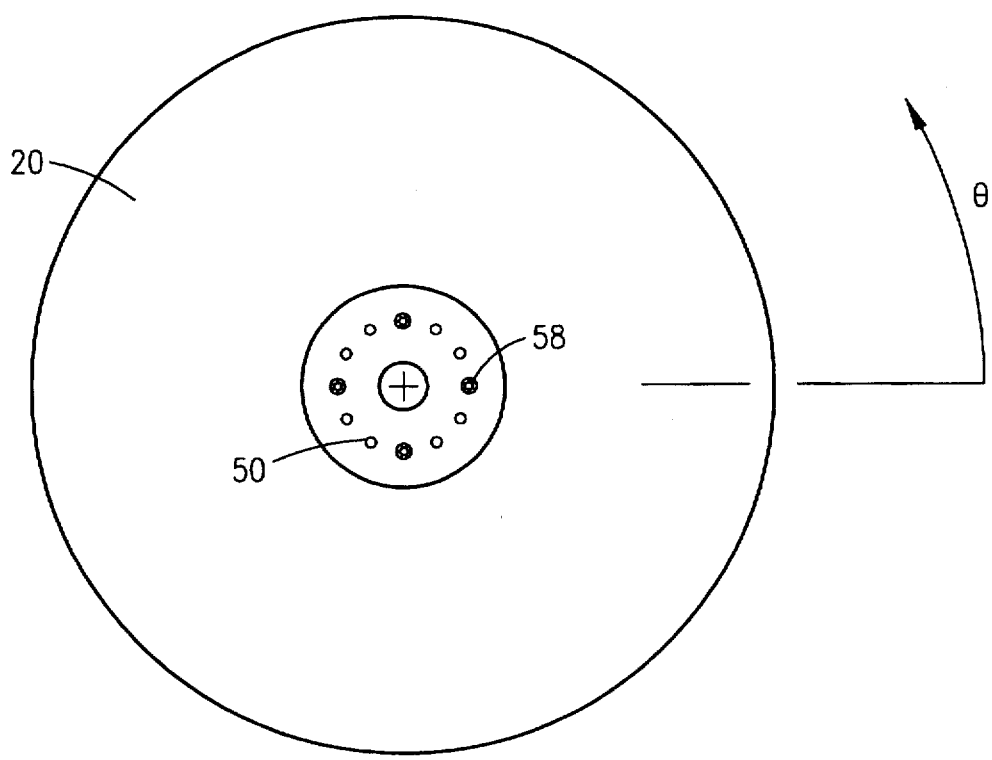
FIG. 8a presents a schematic top view of the dual disc clamp of the present invention fastened onto a disc by four screws.
Figure 8B:
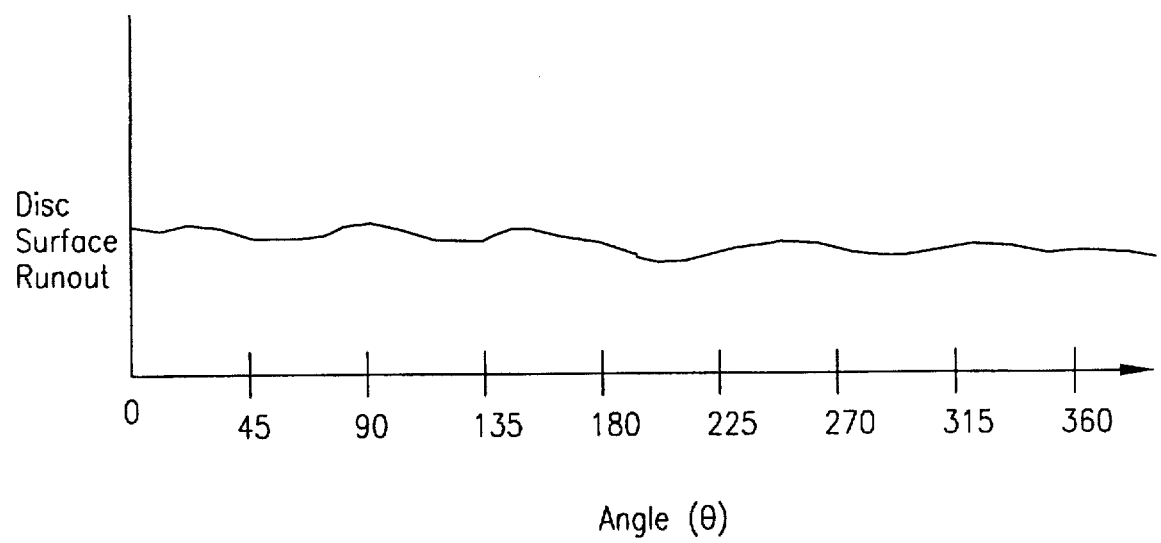
FIG. 8b presents a graph illustrating the small disc waviness or distortion caused by the dual disc clamp of the present invention.

FIG. 8a presents a schematic top view of the disc and the dual disc clamp according to the present invention. The disc clamp 40 has a first circular member 50 juxtaposed with a second circular member 52 (not shown in FIG. 8a). Four screws 58, spaced apart 90° from each other, are used to couple the disc clamp 40 to the hub 46 of the spindle motor. FIG. 8b is a graph illustrating the distortion caused by an embodiment of the dual disc clamp of the present invention. As can be seen FIG. 8b, due to the arrangement of the circular members and the use of the a plurality of holes in the second circular member, the surface of the disc remains substantially flat.

Figure 9:
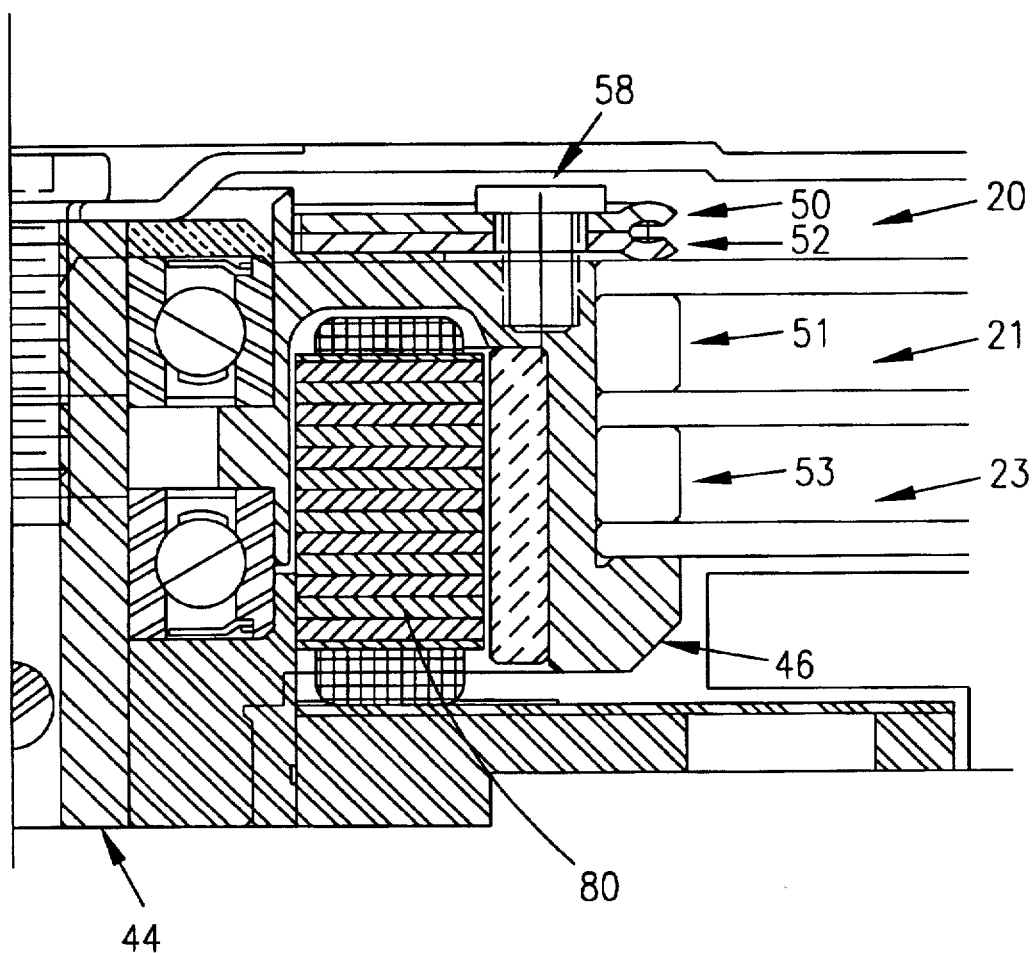
FIG. 9 presents cross-sectional side view of the dual disc clamp of the present invention clamping a plurality of disc to a spindle motor.

FIG. 9 presents a partial cross-sectional side view of the dual disc clamp clamping a plurality of discs to a fixed-shaft spindle motor. In operation, the discs 20, 21 and 23 are applied to the hub 46 of a fixed-shaft spindle motor 44 being separated by annular spacers 51 and 53, respectively. The first circular member 50 and the second circular member 52 of the dual disc clamp are coupled to the hub of the spindle motor 44 through the use of four screws 58 (only one screw is shown in the figure). When the screws are tightened, the compressive force exerted by the screws 58 on the first circular member are distributed over the surface of the second clamp member by the twelve holes formed on the second circular member 52 as described above. The distributed force is then applied to the top surface of the hard disc 20 which is used to hold the other hard discs 21 and 23 in place.

As shown in FIG. 9, the screws 58 are provided near the outer circumferential edge of the first and second circular members 50 and 52, away from the laminations 80 of the spindle motor 44. By placing the screws 58 near the outer circumferential edge of each circular member instead of near the center of the clamp structure as is done in conventional clamping structures, more room is available for motor stator laminations. The spindle motor of the present invention has a greater number of laminations 80 than is found in conventional spindle motors and produces more torque constant than conventional spindle motors. By providing for the use of higher torque constant spindle motors less current is required to start and run the spindle motors.

The foregoing description of the embodiments has been presented for the purposes of illustration and description. It is not intended to be exhaustive or to limit the invention to the precise form disclosed, and obviously, modifications and variations of the invention are possible in light of the above teaching. The dual disc clamp for use with powerful spindle motors was described in order to best describe the principles of the invention and its practical application to thereby enable others skilled in the art to best utilize the invention and various embodiments and with various modifications as are suited to the particular use contemplated. It is intended that the scope of the invention be defined by the claims appended hereto.

What is claimed is:

1. A disc clamp for a disc drive, the disc drive including at least one storage disc supported on a hub, the disc clamp comprising:

a first circular member including a first plurality of holes for receiving one or more fastening mechanisms, said first circular member including a first inner diameter, and a first outer diameter radially outward from said first inner diameter; and a second circular member including a second plurality of holes, and including a second inner diameter, and a second outer diameter radially outward from said second inner diameter, said first circular member having no contact with an uppermost storage disc of the at least one storage disc, and said first circular member having a portion of said first inner diameter supported on a portion of said second inner diameter such that a force on said first circular member is transmitted from said first inner diameter to said second inner diameter, from said second inner diameter to said second outer diameter, and from said second outer diameter to the at least one disc.

2. A disc clamp as recited in claim 1, wherein said first circular member has a concave upper surface and said second circular member has a convex upper surface.

3. The disc clamp as recited in claim 1, wherein said first plurality of holes comprise four holes, each of said four holes being used to allow the one or more fastening mechanisms to compressively couple together said first and second circular members.

4. A disc clamp as recited in claim 1, wherein said first plurality of holes are located in said first outer diameter of said first circular member.

5. A disc clamp as recited in claim 1, wherein said second plurality of holes are located in said second outer diameter of said second circular member.

6. A disc clamp as recited in claim 1, said one or more fastening mechanisms fitting through at least some of said first and second plurality of holes into the hub, said one or more fastening mechanisms exerting a compressive force on the disc clamp to hold the disc clamp against the at least one storage disc.

7. A disc clamp as recited in claim 6, said one or more fastening mechanisms comprising screws.

8. A disc clamp as recited in claim 6, said one or more fastening mechanisms comprising four screws.

9. A disc clamp as recited in claim 8, wherein said second plurality of holes comprises twelve holes.

10. A disc clamp as recited in claim 1, wherein the disc clamp is formed of steel.

11. A disc clamp as recited in claim 1, wherein said first circular member has the same shape and dimensions as the second circular member.

12. A disc clamp for a disc drive, the disc drive including at least one storage disc supported on a hub, the disc clamp comprising:
   a first circular member including a first plurality of holes for receiving one or more fastening mechanisms, said first circular member including a first inner diameter, and a first outer diameter radially outward from said first inner diameter; and
   a second circular member including a second plurality of holes for receiving the one or more fastening mechanisms and a third plurality of holes not intended for receiving the one or more fastening mechanisms, said third plurality of holes provided for increasing a number of holes in said second circular member to reduce distortion in said second circular member resulting from any one hole in said second circular member, said second circular member further including a second inner diameter and a second outer diameter radially outward from said second inner diameter, said first circular member having a portion of said first inner diameter supported on a portion of said second inner diameter.

13. A disc clamp as recited in claim 12, wherein said second plurality of holes comprises four holes.

14. A disc clamp as recited in claim 13, wherein said third plurality of holes comprises eight holes.

15. A disc clamp for a disc drive, the disc drive including at least one storage disc supported on a hub, the disc clamp comprising:
   a first circular member including a first plurality of holes, said first circular member including a first inner diameter, and a first outer diameter radially outward from said first inner diameter;
   a second circular member including a second plurality of holes and a third plurality of holes, and including a second inner diameter and a second outer diameter radially outward from said second inner diameter, said first circular member having a portion of said first inner diameter supported on a portion of said second inner diameter;

fastening means, fitting through said first and second plurality of holes, for exerting a first force on said first circular member, said first circular member transmitting at least a portion of said first force to said second circular member, and said second circular member exerting at least a portion of said first force on the at least one disc; and
   said third plurality of holes provided for increasing a number of holes in said second circular member to decrease a distortion in said second circular member resulting from any one hole in said second circular member.

16. A disc clamp as recited in claim 15, wherein said second plurality of holes comprises four holes.

17. A disc clamp as recited in claim 16, wherein said third plurality of holes comprises eight holes.

18. A disc clamp as recited in claim 15, wherein said first circular member has the same shape and dimensions as said second circular member.

19. A disc clamp as recited in claim 15, wherein said first circular member has a concave upper surface and said second circular member has a convex upper surface.

20. A disc drive, comprising:
   at least one storage disc for storing information;
   a spindle motor for rotating said at least one storage disc;
   a hub for rotatably supporting said at least one storage disc with respect to said spindle motor;
   a transducer for transferring information to and from said at least one storage disc; and
   a disc clamp, including:
      a first circular member including a first plurality of holes, said first circular member having no contact with an uppermost storage disc of said at least one storage disc, and said first circular member including a first inner diameter and a first outer diameter radially outward from said first inner diameter,
      a second circular member including a second plurality of holes, and including a second inner diameter, and a second outer diameter radially outward from said second inner diameter, said first circular member having a portion of said first inner diameter supported on a portion of said second inner diameter,
      fastening means, fitting through said first and second plurality of holes, for exerting a first force on said first circular member, said first circular member transmitting at least a portion of said first force to said second circular member, and said second circular member exerting at least a portion of said first force on the at least one disc, and
      means for reducing distortion in said second circular member resulting from said second plurality of openings.

21. A disc drive as recited in claim 20, said spindle motor including laminations, said fastening means located radially outward from said laminations with respect to an axis of rotation of said spindle motor.

* * * * *